(12) United States Patent
Kim

(10) Patent No.: US 12,546,859 B2
(45) Date of Patent: Feb. 10, 2026

(54) RADAR CONTROL DEVICE, METHOD AND SYSTEM

(71) Applicant: HL KLEMOVE CORP., Incheon (KR)

(72) Inventor: Dae Gyeong Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 642 days.

(21) Appl. No.: 17/585,525

(22) Filed: Jan. 26, 2022

(65) Prior Publication Data

US 2022/0236374 A1 Jul. 28, 2022

(30) Foreign Application Priority Data

Jan. 27, 2021 (KR) .................. 10-2021-0011662

(51) Int. Cl.
*G01S 7/40* (2006.01)
*G01S 13/86* (2006.01)
*G01S 13/931* (2020.01)

(52) U.S. Cl.
CPC ............. *G01S 7/40* (2013.01); *G01S 7/403* (2021.05); *G01S 13/865* (2013.01); *G01S 13/931* (2013.01)

(58) Field of Classification Search
CPC .......... G01S 7/40; G01S 7/403; G01S 13/865; G01S 13/931
See application file for complete search history.

(56) References Cited

U.S. PATENT DOCUMENTS

| | | | | |
|---|---|---|---|---|
| 2016/0187466 A1* | 6/2016 | Kim | ................ | G01S 13/931 342/59 |
| 2017/0261600 A1* | 9/2017 | Maennicke | ........ | G01S 7/4026 |
| 2017/0307730 A1* | 10/2017 | Baba | ................ | G08G 1/166 |
| 2018/0190016 A1* | 7/2018 | Yang | ................ | G06V 20/58 |
| 2020/0110154 A1* | 4/2020 | Moon | ................ | G01S 7/4972 |
| 2020/0174107 A1* | 6/2020 | Briggs | ................ | H04N 23/90 |
| 2020/0226790 A1* | 7/2020 | Alvarez | ............. | G01S 13/865 |
| 2020/0331471 A1* | 10/2020 | Takahashi | ...... | B60W 60/0015 |
| 2020/0410704 A1* | 12/2020 | Choe | ................ | G01S 7/497 |
| 2021/0192234 A1* | 6/2021 | Chen | ................ | B60W 60/001 |
| 2021/0349182 A1* | 11/2021 | Jin | ................ | G01S 7/403 |
| 2022/0229168 A1* | 7/2022 | Kondo | ............. | G01S 7/4034 |
| 2022/0365193 A1* | 11/2022 | Wetoschkin | .... | G01S 7/4972 |
| 2023/0008630 A1* | 1/2023 | Kondo | ............. | G01S 7/4091 |
| 2023/0044311 A1* | 2/2023 | Matsuo | ............ | G01S 13/931 |

* cited by examiner

*Primary Examiner* — William Kelleher
*Assistant Examiner* — Noah Yi Min Zhu
(74) *Attorney, Agent, or Firm* — WOMBLE BOND DICKINSON (US) LLP

(57) ABSTRACT

A radar control device includes a receiver configured to receive first forward driving information which is a detection result of a front of a host vehicle from a lidar and second forward driving information which is a detection result of the front of the host vehicle from a radar; a straight line determiner configured to, when an object around the host vehicle is continuously detected in a predetermined direction based on the first and second forward driving information, determine a first straight line based on the first forward driving information, and determine a second straight line based on the second forward driving information; and a controller configured to determine a correction angle of the radar based on an intersection angle between the first straight line and the second straight line, and generate a control signal for an angle correction of the radar according to the correction angle.

17 Claims, 9 Drawing Sheets

RADAR CONTROL DEVICE, METHOD AND SYSTEM

CROSS REFERENCE TO RELATED APPLICATION

This application claims priority from Korean Patent Application No. 10-2021-0011662, filed on Jan. 27, 2021, which is hereby incorporated by reference for all purposes as if fully set forth herein.

TECHNICAL FIELD

The present embodiments of the present disclosure relate to a radar control device, method and system for correcting a mounting angle of a radar.

Recently, there is increasing a number of vehicles equipped with radar device. The electronic control unit of a vehicle may calculate the distance, relative speed, and angle between an object around the host vehicle and the host vehicle based on information output from the radar mounted on the vehicle.

Accordingly, a vehicle equipped with a radar may provide various safety functions or convenience functions by using the distance, relative speed, and angle between an object around the host vehicle and the host vehicle.

For example, the collision prevention function during parking and stopping, the smart cruise function or the automatic parking function while driving may be implemented by using information input from the radar mounted on the vehicle to detect the distance, angle, or relative speed between the host vehicle and the object around the host vehicle.

As described above, since the radar mounted on the vehicle is important to perform various vehicle functions, the reliability of the information input from the radar is also important. However, since the radar is installed in the vehicle, the radar is subjected to various shocks due to the driving of the vehicle or various causes, and accordingly, there is a possibility that the radar may deviate from the initial mounting position.

Accordingly, if the radar deviates from the proper mounting position, there may be lowered the reliability of information output from the radar, thereby lowering the reliability of various functions provided by the vehicle.

SUMMARY

In this background, embodiments of the present disclosure provide a radar control device, method and system for determining a correction angle of a radar based on a measurement value of an object detected by a lidar and a measurement value of an object detected by the radar.

In an aspect of the present disclosure, there is provided a radar control device including a receiver configured to receive first forward driving information which is a detection result of a front of a host vehicle from a lidar and second forward driving information which is a detection result of the front of the host vehicle from a radar, a straight line determiner configured to, in the case that an object around the host vehicle is continuously detected in a predetermined direction based on the first forward driving information and the second forward driving information, determine a first straight line based on the first forward driving information, and determine a second straight line based on the second forward driving information, and a controller configured to determine a correction angle of the radar based on an intersection angle between the first straight line and the second straight line, and generate a control signal for an angle correction of the radar according to the correction angle.

In another aspect of the present disclosure, there is provided a radar control method including receiving first forward driving information which is a detection result of a front of a host vehicle from a lidar and second forward driving information which is a detection result of the front of the host vehicle from a radar, determining, in the case that an object around the host vehicle is continuously detected in a predetermined direction based on the first forward driving information and the second forward driving information, a first straight line based on the first forward driving information, and determining a second straight line based on the second forward driving information, and determining a correction angle of the radar based on an intersection angle between the first straight line and the second straight line.

In another aspect of the present disclosure, there is provided a radar control system including one or more lidars provided in a host vehicle, one or more radars provided in the host vehicle, and a radar control device configured to receive first forward driving information which is a detection result of a front of a host vehicle from the lidar and second forward driving information which is a detection result of the front of the host vehicle from the radar, determine, in the case that an object around the host vehicle is continuously detected in a predetermined direction based on the first forward driving information and the second forward driving information, a first straight line based on the first forward driving information, and determine a second straight line based on the second forward driving information, and determine a correction angle of the radar based on an intersection angle between the first straight line and the second straight line, and generate a control signal for an angle correction of the radar according to the correction angle.

According to the present disclosure, the radar control device, method and system may compare a first straight line and a second straight line determined based on the detection information of the lidar and the radar in the straight section to determine a correction angle for the radar, and may correct the angle of the radar based on the correction angle, so that it is possible to improve the reliability of the detection information of the radar and implement safer driving.

DETAILED DESCRIPTION

Figure 1:
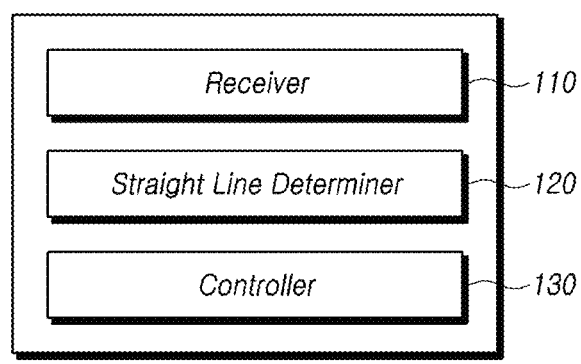
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a radar control device 10 according to an embodiment of the present disclosure with reference to the accompanying drawings.

FIG. 1 is a block diagram illustrating a radar control device 10 according to an embodiment of the present disclosure.

Referring to FIG. 1, the radar control device 10 according to an embodiment of the present disclosure may include a receiver 110, a straight line determiner 120, a controller 130, and the like.

The radar control device 10 according to an embodiment of the present disclosure may be mounted on a host vehicle 20 to improve the reliability of radar detection information used for the driver's driving of the hoas vehicle 20 and a advanced driver assistance systems (ADAS).

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar control device 10 may be mounted on the host vehicle 20 to detect an object such as a preceding vehicle 30 and a guard rail running in front of the host vehicle 20. In addition, if it is determined that the road is a straight road based on the detected object, the radar control device 10 may correct the mounting angle of the radar using a radar and a lidar.

Here, the host vehicle 20 may refer to a vehicle capable of moving on the ground without using a railroad or a built-in line by mounting a prime mover and rolling wheels with the power, however, is not limited thereto. The host vehicle 20 may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle 20, or an autonomous vehicle that automatically travels without driver intervention.

The receiver 110 may receive a first forward driving information which is a detection result of the front of the host vehicle 20 acquired from a lidar and a second forward driving information which is a detection result of the front of the host vehicle 20 acquired from a radar.

Here, the "lidar" is an abbreviation of 'light detection and ranging', and may be an active detection device that acquires desired information without direct contact with an object through a laser using the same principle as radar. In addition, the lidar may be mounted on an aircraft equipped with a Global Positioning System (GPS) and an Inertial Navigation System (INS) to acquires precise three-dimensional topographic information (Digital Elevation Model: DEM) and survey the topography of the coastline and shallow waters. In addition, lidar has a more precise extraction of objects and lanes than an image sensor such as a camera, and may have a wide range of detection areas.

The radar may include one or more transmission and one or more receiving antennas, and each antennas transmission/receiving antenna may be an array antenna in which one or more radiating elements are connected in series by a feed line, but is not limited thereto.

The radar may include a plurality of transmission antennas and a plurality of receiving antennas, and may have various types of antenna array structures according to an arrangement order and an arrangement interval thereof.

The radar may provide a function of transmitting a transmission signal through a switched transmission antenna by switching the radar to one of a plurality of transmission antennas included in the radar or transmitting a transmission signal through a multi-transmission channel allocated to the plurality of transmission antennas.

The radar may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The radar may receive a reception signal received by being reflected from an object through a receiving antenna.

In addition, the radar may provide a function of receiving a reception signal, which is a reflection signal of the transmission signal reflected by a target, through the switched reception antenna by switching to one of a plurality of receiving antennas, or a function of receiving a reception signal through multi-receiving channels allocated to a plurality of receiving antennas.

The a radar may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

That is, the receiver 110 may receive the first forward driving information and the second forward driving information which are the detection results of the front of the host vehicle 20 obtained from each of the aforementioned lidar and radar, respectively.

Figure 2:
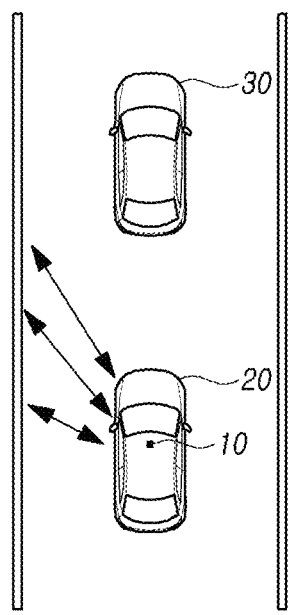
FIG. 2 is a diagram for explaining determining that a host vehicle is traveling on a straight road by detecting the surroundings of the host vehicle, according to an embodiment.

FIG. 2 is a diagram for explaining determining that a host vehicle 20 is traveling on a straight road by detecting the surroundings of the host vehicle, according to an embodiment.

Referring to FIG. 2, if an object around the host vehicle 20 is continuously detected in a predetermined direction in the first forward driving information and the second forward driving the information, straight line determiner 120 may determine a first straight line 510 based on the first forward driving information and determine a second straight line 710 based on the second forward driving information.

Since the radar is to provide information about the object by detecting a surrounding object, if the mounting angle of the radar is misaligned, proper information cannot be provided to the driver. In order to determine whether the mounting angle of the radar is misaligned, there may compare the object detection result detected by the radar with the object detection result of a device with a similar function. For example, the radar may determine whether the mounting angle of the radar is misaligned by comparing the detection result with the detection result of the object of the lidar performing a similar function.

In this case, in order to more accurately compare the detection result of the radar and the detection result of the lidar, there may be required a specific criterion or a specific reference. Here, the specific criterion may be set based on an object having a specific shape. For example, the object may mean an object having a specific surface, such as a guard rail, a sound barrier, a road divider, or the like installed over a specific road section.

In addition, the straight line determiner 120 may determine whether the host vehicle 20 is traveling on a straight road before determining the first straight line 510 and the second straight line 710. For example, if an object detected by the radar and the lidar is an object that satisfies specific criteria, such as a guard rail, sound barrier, road divider, or the like, and the object has a specific surface and is continuously detected in an object formation direction, the straight line determiner 120 may determine that the host vehicle 20 is traveling on a straight road.

In the case that it is determined that the host vehicle 20 is traveling on a straight road, the straight line determiner 120 may determine the first straight line 510 for an object continuously detected in a predetermined direction in the first forward driving information which is a result of forward detection by the lidar, and the second straight line 710 for an object continuously detected in a predetermined direction in the second forward driving information which is the result of the forward detection by the radar. That is, the first straight line 510 and the second straight line 710 may be determined based on the same object.

Accordingly, the straight line determiner 120 may determine whether the mounting angle of the radar is misaligned by comparing, for the same object, the second straight line 710 determined based on the result detected by the radar with the first straight line 510 determined based on the result detected by the lidar.

Figure 3:
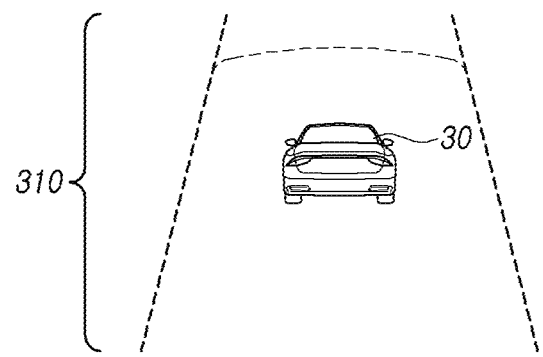
FIG. 3 is a diagram for explaining first forward driving information according to an exemplary embodiment.

FIG. 3 is a diagram for explaining first forward driving information according to an exemplary embodiment.

Referring to FIG. 3, the first forward driving information that is a result of detecting the surroundings by the lidar may be determined. FIG. 3 is a diagram illustrating any one of a plurality of angles that can be detected by the lidar as an example. The straight line determiner 120 may determine a plurality of first measurements 310 positioned in a predetermined direction, and may determine the first straight line 510 to be positioned within a predetermined distance from the first measurements.

The predetermined direction may mean a formation direction of continuously detected objects. All directions above and below may be interpreted as meaning the formation directions of the continuously detected object.

A measurement of the lidar indicating a position where the transmission signal transmitted from the lidar is reflected by the object may be determined similarly to the formation direction of the object. That is, the first straight line 510 may be determined in a direction similar to the formation direction of the object. For example, in the case of a guard rail on which the object is disposed on a straight road, it may be a straight line having the same shape as a straight road, and the direction of the first straight line 510 may be a direction similar to that of the guard rail.

In addition, the straight line determiner 120 may determine the first straight line 510 to be located within a predetermined distance from the plurality of first measurements 310, that is s measurements indicating where the object is reflected, located in a predetermined direction.

Figure 4:
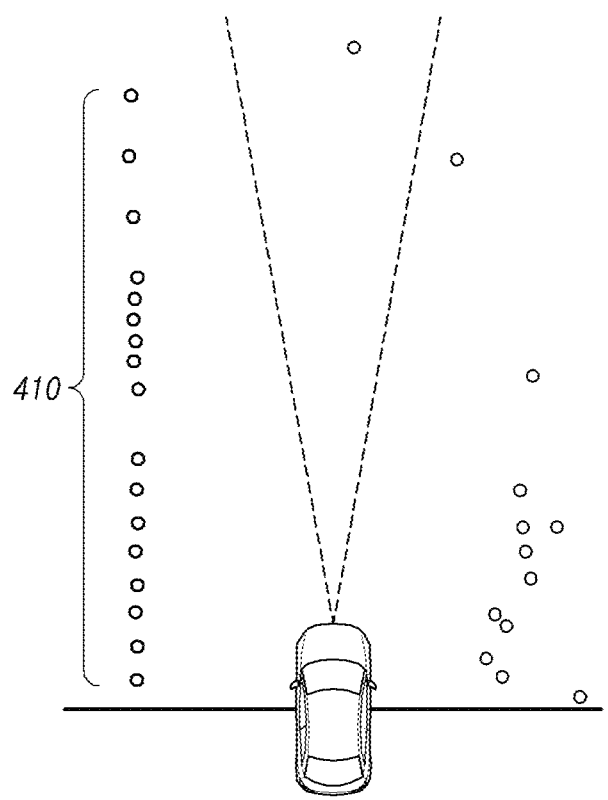
FIG. 4 is a diagram for explaining second forward driving information according to an exemplary embodiment.

FIG. 4 is a diagram for explaining second forward driving information according to an exemplary embodiment.

Referring to FIG. 4, the second forward driving information that is a result of detecting the surroundings by the radar may be determined in two dimensions. FIG. 4 may illustrate a result determined by a measurement value of a radar indicating a position where a signal transmitted from the radar is reflected.

The straight line determiner 120 may determine the second straight line 710 to be located within a predetermined distance from a plurality of second measurements 410 located in a predetermined direction.

In particular, the predetermined direction may mean a direction in which the object is continuously detected similarly to the case of determining the first straight line 510 in the above-described first forward driving information, and accordingly, the second straight line 710 may be determined similarly to the formation direction of the detected object.

In addition, the second measurements 410 may be a value measured from the signal reflected at the object. Accordingly, since the second straight line 710 is determined in a direction similar to a predetermined direction, which is a formation direction of the object, the second straight line may be determined to be located within a predetermined distance from the plurality of second measurements 410.

Figure 5:
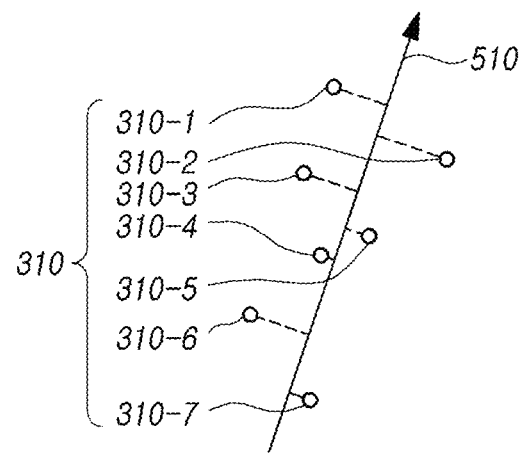
FIG. 5 is a diagram for explaining a determination of a first straight line according to an embodiment.

FIG. 5 is a diagram for explaining a determination of a first straight line according to an embodiment.

Referring to FIG. 5, the first straight line 510 may be determined as a straight line connecting points having the smallest distance to each of the plurality of first measurements 310-1, 310-2, 310-3, 310-4, 310-5, 310-6, and 310-7.

Specifically, the first measurements 310 are located along a predetermined direction, and the first straight line 510 is calculated within a predetermined distance from the first measurements 310. In this case, the straight line determiner 120 may determine, as the first straight line 510, a straight line connecting points having the shortest distance from each of the plurality of first measurements 310.

The lidar measurements may not always reflect accurate information about an object. Accordingly, the straight line determiner 120 may determine the first straight line to reflect the directionality of each measurement value in determining the first straight line 510 in order to have the smallest distance error.

As described above, in the radar control device 10, since the first straight line 510 is determined as a straight line connecting the points having the shortest distance from the plurality of first measurements 310, there may be determined more accurate lidar mounting angle. Since the lidar mounting angle may be used to determine a correction angle for the radar, as a more accurate lidar mounting angle is determined, a more accurate radar correction angle may be determined.

Figure 6:
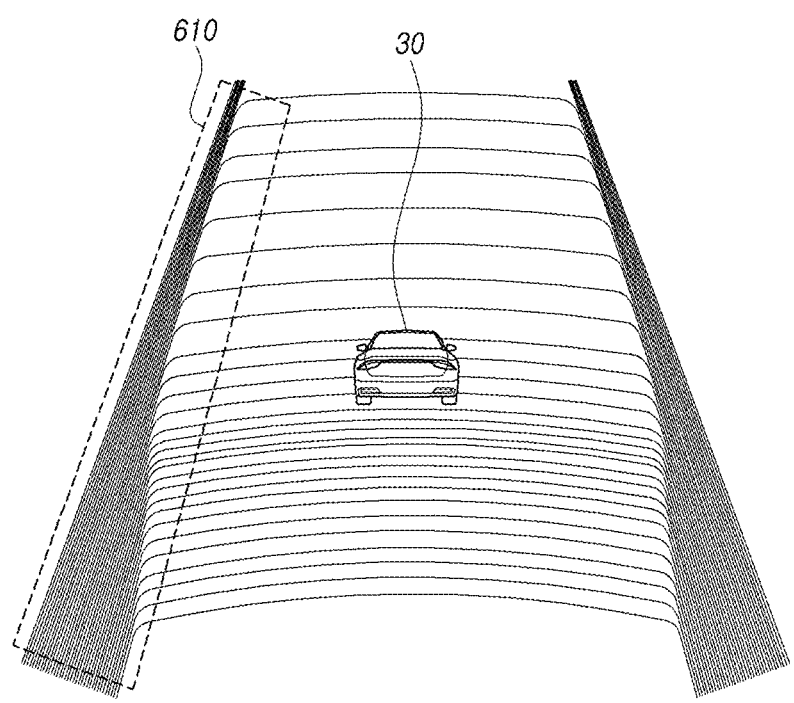
FIG. 6 is a diagram for explaining a straight-line determination area according to an embodiment.

FIG. 6 is a diagram for explaining a straight-line determination area 610 according to an embodiment.

The straight line determiner 120 may determine the first straight line 510 based on the third measurements calculated as a plane at a plurality of angles. Specifically, the lidar may detect the surrounding of the host vehicle 20 from a plurality of angles and calculate a measurement result for each angle, and the three-dimensional data may be visualized in two dimensions and determined as shown in FIG. 6.

Referring to FIG. 6, the straight line determiner 120 may determine the straight-line determination area 610 including third measurements, and determine the first straight line 510 to be located in a predetermined direction within the straight-line determination area 610.

As described above, the radar control device 10 may determine a more accurate lidar mounting angle by determining a straight line positioned toward a predetermined direction within the straight-line determination area 610 determined at a plurality of angles as the first straight line 510. Accordingly, in that the radar mounting angle is used for determining the radar correction angle, it is possible to determine the correction angle of the radar more accurately.

The controller 130 may determine the correction angle of the radar based on an intersection angle between the first straight line 510 and the second straight line 710, and generate a control signal for an angle correction of the radar according to the correction angle. The control signal may be applied to mounting angle correction device that physically corrects the mounting angle of the radar. Through this, the mounting angle of the radar may be corrected vertically or horizontally. Alternatively, the control signal may be applied to angle correction device for correcting the mounting angle of the radar software. Through this, the radiation angle of the signal radiated to the radar may be corrected.

The controller 130 may determine and use Equation 1, which is an equation of a straight line with respect to the first straight line 510, and Equation 2, which is an equation of a straight line with respect to the second straight line 710, as follows.

$$Y = A_{lidar}x + B_{lidar} \quad \text{[Equation 1]}$$

$$y = A_{radar}x + B_{radar} \quad \text{[Equation 2]}$$

In Equation 1, $A_{lidar}$ and $B_{lidar}$ may be constants for determining the first straight line 510, and in Equation 2, $A_{radar}$ and $B_{radar}$ may be constants for determining the second straight line 710.

Figure 7:
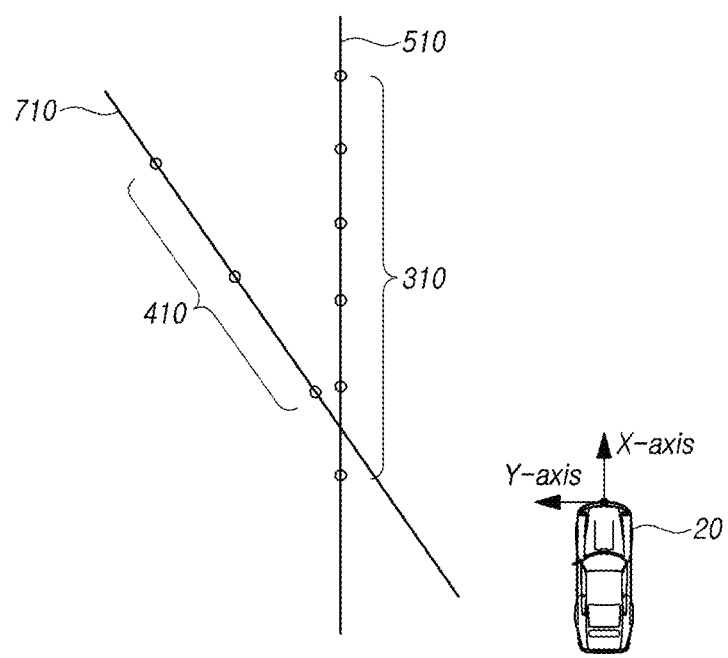
FIG. 7 is a diagram for explaining determining a correction angle of a radar based on a first straight line and a second straight line, according to an embodiment.

FIG. 7 is a diagram for explaining determining a correction angle of a radar based on a first straight line 510 and a second straight line 710, according to an embodiment.

Referring to FIG. 7, the controller 130 may determine a correction angle of the radar based on an intersection angle $\theta_{err}$ between the first straight line 510 and the second straight line 710. The intersection angle $\theta_{err}$ may be determined from Equation 3 below.

$$\theta_{err} = \tan^{-1}(A_{radar}) - \tan^{-1}(A_{lidar}) \quad \text{[Equation 3]}$$

$A_{radar}$ in Equation 3 may be the same constant as $A_{radar}$ in Equation 2, and $A_{lidar}$ in Equation 3 may be the same constant as $A_{lidar}$ in Equation 1. The intersection angle calculated by Equation 3 may mean an acute angle among the angles between the first straight line 510 and the second straight line 710.

That is, the controller 130 may determine, as the intersection angle, an angle at which an inclination of the second straight line coincides with an inclination of the first straight line.

The controller 130 may calculate the correction angle of the radar by applying a predetermined coefficient corresponding to the intersection angle between the angles θerr. The detection signal for the front of the host vehicle 20 by the radar and the lidar may be unstable depending on road conditions.

Since the controller 130 may determine the correction angle of the radar by applying a predetermined coefficient corresponding to the calculated intersection angle, there may be increased the accuracy of the correction angle of the radar.

According to the radar control device 10 according to the present embodiments, since the mounting angle of the radar can be corrected in real time while driving, there may enhance the reliability of the detection information of the radar and implement safer driving.

The radar control device 10 may be implemented as an electronic control unit (ECU), a microcomputer, or the like.

In an embodiment, a computer system (not shown) such as the radar control device 10 may be implemented as an electronic control unit (ECU). The electronic control unit may include at least one or more elements of one or more processors, memories, storage unit, user interface input unit and user interface output unit, which may communicate with each other . . . via a bus. Further, the computer system may also include a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the radar control device 10 according to the present embodiment and the receiver 110, the straight line determiner 120 and the controller 130 included therein may be implemented as a module of a control device or an ECU of a radar system mounted on a vehicle.

The control device or ECU of such a radar system may include a processor, a storage device such as a memory, and a computer program capable of performing a specific function. In addition, the above-described receiver 110, the straight line determiner 120 and the controller 130 may be implemented as software modules capable of performing respective corresponding functions.

That is, the receiver 110, the straight line determiner 120 and the controller 130 according to the present embodiment may be implemented as respective software modules and stored in a memory, and each software module may be executed at a specific time point in an arithmetic processing unit such as an ECU included in the steering system.

Hereinafter, it will be described a radar control method using the radar control device 10 capable of performing all of the above-described present disclosure.

Figure 8:
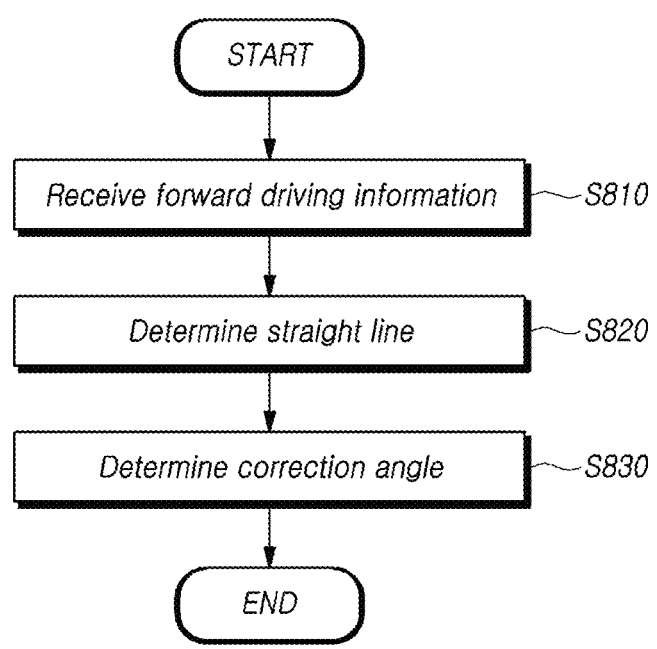
FIG. 8 is a flowchart illustrating a radar control method according to an embodiment of the present disclosure.

FIG. 8 is a flowchart illustrating a radar control method according to an embodiment of the present disclosure.

Referring to FIG. 8, a radar control method according to the present disclosure may include receiving first forward driving information which is a detection result of a front of a host vehicle 20 from a lidar and second forward driving information which is a detection result of the front of the host vehicle 20 from a radar (S810), determining, in the case that an object around the host vehicle 20 is continuously detected in a predetermined direction based on the first forward driving information and the second forward driving information, a first straight line 510 based on the first forward driving information, and determining a second straight line 710 based on the second forward driving information (S820), and determining a correction angle of the radar based on an intersection angle between the first straight line 510 and the second straight line 710 (S830).

In step S820 of determining the first straight line, the first straight line 510 may be determined to be located within a predetermined distance from a plurality of first measurements 310 located in the predetermined direction.

In this case, the first straight line 510 may be determined by a straight line connecting points having the smallest distance from each of the plurality of first measurements 310.

In step S820 of determining the second straight line, the second straight line may be determined to be located within a predetermined distance from a plurality of second measurements 410 located in the predetermined direction.

In step S830 of determining the correction angle, the intersection angle may be determined as an acute angle among the angles between the first straight line 510 and the second straight line 710.

In step S830 of determining the correction angle, the correction angle of the radar may be determined by applying a predetermined coefficient corresponding to the intersection angle to the intersection angle.

In the step S820 of determining a first straight line, the first straight line 510 may be determined based on the third measurements calculated as a plane at a plurality of angles. For example, the step S820 of determining the first straight line may include determining a straight-line determination area 610 including third measurements, and determining the first straight line 510 to be located toward the predetermined direction within the straight-line determination area 610.

Figure 9:
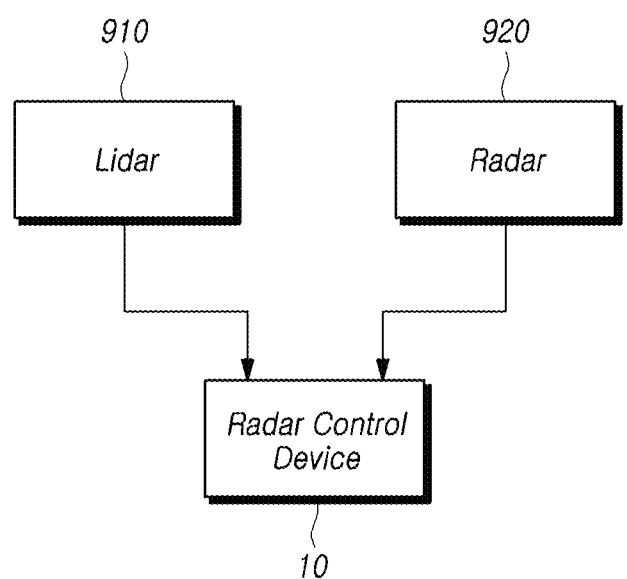
FIG. 9 illustrates a radar control system according to an embodiment of the present disclosure.

FIG. 9 illustrates a radar control system according to an embodiment of the present disclosure.

Referring to FIG. 9, a radar control system 900 according to an embodiment of the present disclosure may a lidar 910, a radar 920 and a radar control device 10. The radar control device 10 may be connected to each of the lidar 910 and the radar 920 by at least one of an electrical connection, a magnetic connection, and a mechanical connection.

The radar control system 900 according to an embodiment of the present disclosure may include one or more lidars 910 provided in a host vehicle, one or more radars 920 provided in the host vehicle, and a radar control device 10 for receiving first forward driving information which is a detection result of a front of a host vehicle from the lidar 910 and second forward driving information which is a detection result of the front of the host vehicle from the radar 920, for determining, in the case that an object around the host vehicle is continuously detected in a predetermined direction based on the first forward driving information and the second forward driving information, a first straight line 510 based on the first forward driving information, and determining a second straight line 710 based on the second forward driving information, and for determining a correction angle of the radar based on an intersection angle between the first straight line 510 and the second straight line 720 to generate a control signal for an angle correction of the radar according to the correction angle.

The lidar 910 provided in the host vehicle may transmit and receive lasers to detect objects and lanes around the host vehicle. One or more lidar 910 may be provided in the host vehicle. For example, one lidar may be provided on the roof panel of the host vehicle, and may detect the surroundings of the host vehicle by rotating 360 degrees. For another example, the lidar 910 may be provided in two on both sides of the front bumper of the host vehicle. That is, the lidar 910 may be provided as a single device, but is not limited thereto, and may be provided in plurality.

The radar 920 provided in the host vehicle may transmit and receive radio waves to detect objects and lanes around the host vehicle. One or more radars 920 may be provided in the host vehicle. For example, one radar 920 may be provided in the center of the front bumper of the host vehicle. For another example, three radars 920 may be provided on the center, left side, and right side of the front bumper of the host vehicle. That is, the radar 920 may be provided as a single, but is not limited thereto, and may be provided in plurality.

The radar control device 10 may receive first forward driving information which is a detection result of a front of a host vehicle from the lidar 910 and second forward driving information which is a detection result of the front of the host vehicle from the radar 920. In addition, in the case that an object around the host vehicle is continuously detected in a predetermined direction based on the first forward driving in information and the second forward driving information, the radar control device may determine a first straight line 510 based on the first forward driving information and determine a second straight line 710 based on the second forward driving information, and may determine a correction angle of the radar based on an intersection angle between the first straight line 510 and the second straight line 720 to generate a control signal for an angle correction of the radar according to the correction angle.

In the case that an object around the host vehicle is continuously detected in a predetermined direction based on the first forward driving information which is a detection result of a front of a host vehicle from the lidar 910, the radar control device 10 may determine the first straight line 510 to be located within a predetermined distance from a plurality of first measurements located in the predetermined direction. In this case, the first straight line 510 may be determined by a straight line connecting points having the smallest distance from each of the plurality of first measurements.

In addition, if an object around the host vehicle is continuously detected in a predetermined direction based on the second forward driving information which is a detection result of a front of a host vehicle from the radar 920, the radar control device 10 may determine the second straight line 710 to be located within a predetermined distance from a plurality of second measurements located in the predetermined direction.

The radar control device 10 may determine the correction angle of the radar 920 based on an intersection angle between the first straight line 510 and the second straight line 710. The intersection angle may be determined as an acute angle among angles between the first straight line 510 and the second straight line 710. In addition, the correction angle of the radar 920 may be determined by applying a predetermined coefficient corresponding to the intersection angle to the intersection angle.

The radar control device 10 may generate a control signal for correcting a mounting angle of the radar 920 based on the determined correction angle. The control signal may be applied to a mounting angle correction device for physically correcting a mounting angle of the radar 920. Accordingly, the mounting angle of the radar 920 may be corrected vertically or horizontally. Alternatively, the control signal may be applied to a mounting angle correction device for correcting a mounting angle of the radar 920 by software. Accordingly, the radiation angle of the signal emitted from the radar 920 may be corrected.

In addition, the radar control device 10 may perform all of the operations described with reference to FIGS. 1 to 8. Accordingly, for the radar control device 10 included in the radar control system 900, embodiments of the present disclosure described with reference to FIGS. 1 to 8 may be applied.

As described above, according to the present disclosure, the radar control device, method and system may compare a first straight line and a second straight line determined based on the detection information of the lidar and the radar in the straight section to determine a correction angle for the radar, and may correct the angle of the radar based on the correction angle, so that it is possible to improve the reliability of the detection information of the radar and implement safer driving.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be; applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
   a receiver configured to receive first forward driving information which is a detection result of a front of a host vehicle from a lidar and second forward driving information which is a detection result of the front of the host vehicle from a radar;
   a straight line determiner configured to, in the case that an object around the host vehicle is continuously detected in a specific direction based on the first forward driving information and the second forward driving information, determine a first straight line based on the first forward driving information, and determine a second straight line based on the second forward driving information, wherein the first straight line is determined by determining third measurements, which are three-dimensional lidar data measured by the lidar, converting the third measurements into a two-dimensional plane, determining a straight-line determination area comprising the two-dimensional plane, and determining the first straight line to be located in the specific direction, which is a direction in which the object is continuously detected, within the straight-line determination area based on the first forward driving information; and
   a controller configured to determine a correction angle of the radar based on an intersection angle between the first straight line and the second straight line, generate a control signal for an angle correction of the radar according to the correction angle, and send the control signal to a mounting angle correction device.

2. The radar control device of claim 1, wherein the controller determines the correction angle of the radar by applying a predetermined coefficient corresponding to the intersection angle to the intersection angle.

3. The radar control device of claim 1, wherein the straight line determiner determines the first straight line to be located within a predetermined distance from a plurality of first measurements located in the predetermined-specific direction.

4. The radar control device of claim 3, wherein the first straight line is determined by determining a straight line minimizing a distance from each of the plurality of first measurements.

5. The radar control device of claim 1, wherein the straight line determiner determines the second straight line to be located within a predetermined distance from a plurality of second measurements located in the predetermined specific direction.

6. The radar control device of claim 1, wherein the controller determines, as the intersection angle, an acute angle among the angles between the first straight line and the second straight line.

7. A radar control method comprising:
   receiving first forward driving information which is a detection result of a front of a host vehicle from a lidar and second forward driving information which is a detection result of the front of the host vehicle from a radar;
   determining that an object around the host vehicle is continuously detected in a specific direction based on the first forward driving information and the second forward driving information;

determining a first straight line based on the first forward driving information, and determining a second straight line based on the second forward driving information, wherein the first straight line is determined by determining third measurements, which are three-dimensional lidar data measured by the lidar, converting the third measurements into a two-dimensional plane, determining a straight-line determination area comprising the two-dimensional plane, and determining the first straight line to be located in the specific direction, which is a direction in which the object is continuously detected, within the straight-line determination area based on the first forward driving information;

determining a correction angle of the radar based on an intersection angle between the first straight line and the second straight line;

generating a control signal for an angle correction of the radar according to the correction angle, and;

sending the control signal to a mounting angle correction device.

8. The radar control method of claim 7, wherein determining a correction angle comprises determining the correction angle of the radar by applying a predetermined coefficient corresponding to the intersection angle to the intersection angle.

9. The radar control method of claim 7, wherein determining a first straight line comprises determining the first straight line to be located within a predetermined distance from a plurality of first measurements located in the predetermined specific direction.

10. The radar control method of claim 9, wherein the first straight line is determined by determining a straight line minimizing a distance from each of the plurality of first measurements.

11. The radar control method of claim 7, wherein determining a second straight line comprises determining the second straight line to be located within a predetermined distance from a plurality of second measurements located in the predetermined specific direction.

12. The radar control method of claim 7, wherein determining a correction angle comprises determining, as the intersection angle, an acute angle among the angles between the first straight line and the second straight line.

13. A radar control system comprising:
one or more lidars provided in a host vehicle;
one or more radars provided in the host vehicle; and
a radar control device configured to,
receive first forward driving information which is a detection result of a front of a host vehicle from the lidar and second forward driving information which is a detection result of the front of the host vehicle from the radar,
determine, in the case that an object around the host vehicle is continuously detected in a specific direction based on the first forward driving information and the second forward driving information, a first straight line based on the first forward driving information, and determine a second straight line based on the second forward driving information, wherein the first straight line is determined by determining third measurements, which are three-dimensional lidar data measured by the lidar, converting the third measurements into a two-dimensional plane, determining a straight-line determination area comprising the two-dimensional plane, and determining the first straight line to be located in the specific direction, which is a direction in which the object is continuously detected, within the straight-line determination area based on the first forward driving information,
determine a correction angle of the radar based on an intersection angle between the first straight line and the second straight line, generate a control signal for an angle correction of the radar according to the correction angle, and send the control signal to a mounting angle correction device.

14. The radar control system of claim 13, wherein the radar control device determines the correction angle of the radar by applying a predetermined coefficient corresponding to the intersection angle to the intersection angle.

15. The radar control system of claim 13, wherein the radar control device determines the first straight line to be located within a predetermined distance from a plurality of first measurements located in the specific direction.

16. The radar control system of claim 15, wherein the first straight line is determined by determining a straight line minimizing a distance from each of the plurality of first measurements.

17. The radar control system of claim 13, wherein the radar control device determines the second straight line to be located within a predetermined distance from a plurality of second measurements located in the specific direction.

* * * * *